(12) United States Patent
Huang

(10) Patent No.: US 9,060,396 B2
(45) Date of Patent: Jun. 16, 2015

(54) MECHANISMS FOR ANTI-FLICKERING

(75) Inventor: Ming-Hsin Huang, Baoshan Township (TW)

(73) Assignee: TSMC SOLID STATE LIGHTING LTD., Hsinchu (TW)

(*) Notice: Subject to any disclaimer, the term of this patent is extended or adjusted under 35 U.S.C. 154(b) by 1193 days.

(21) Appl. No.: 12/894,829

(22) Filed: Sep. 30, 2010

(65) Prior Publication Data

US 2012/0081032 A1    Apr. 5, 2012

(51) Int. Cl.
*H05B 37/02* (2006.01)
*H05B 33/08* (2006.01)

(52) U.S. Cl.
CPC ........... *H05B 33/0815* (2013.01); *Y02B 20/346* (2013.01)

(58) Field of Classification Search
USPC .............................. 315/209 R, 291, 294, 297
See application file for complete search history.

(56) References Cited

U.S. PATENT DOCUMENTS

| | | | |
|---|---|---|---|
| 5,517,086 A | 5/1996 | El-Hamamsy et al. | |
| 5,994,847 A | 11/1999 | Konopka | |
| 6,642,670 B2 | 11/2003 | Zhang et al. | |
| 2008/0122375 A1* | 5/2008 | Yang | 315/185 S |
| 2008/0224636 A1* | 9/2008 | Melanson | 315/307 |
| 2011/0181196 A1* | 7/2011 | Kang et al. | 315/246 |

OTHER PUBLICATIONS

Ming-Hsin Huang et al., "Single-Inductor Multi-Output (SIMO) DC-DC Converters with High Light-Load Efficiency and Minimized Cross-Regulation for Portable Devices" IEEE Journal of Solid-State Circuits, vol. 44, No. 4, Apr. 2009, pp. 1099-1111.

* cited by examiner

*Primary Examiner* — Tung X Le
*Assistant Examiner* — Jonathan Cooper
(74) *Attorney, Agent, or Firm* — Haynes and Boone, LLP (57) ABSTRACT

A circuit comprises a first switch, a second switch, a third switch, and a fourth switch. Each has a first end and a second end. The circuit also comprises a capacitive device having a first capacitive end and a second capacitive end, and a voltage source. A first node having a first voltage is coupled to the first fourth-switch end, to the first second-switch end, and to the first capacitive end. A second node having a second voltage is coupled to the voltage source, to the second fourth-switch end, and to the second third-switch end. A third node is coupled to the second second-switch end, and to the first first-switch end. The first switch and the second switch are controlled such that the first node and the voltage source selectively provide the second voltage.

20 Claims, 7 Drawing Sheets

MECHANISMS FOR ANTI-FLICKERING

TECHNICAL FIELD

The present disclosure is related to mechanisms for anti-flickering.

BACKGROUND

Solid-state lighting (SSL) in conjunction with light-emitting diodes (LEDs) has been widely used for room lighting due to the long life time and low power consumption. The alternating current (AC) voltage used in lighting the LEDs, however, due to its sinusoidal characteristic, can cause flickering effects on the LEDs that are uncomfortable to human eyes. For example, when the voltage to the LED falls below a certain value required to turn on the LEDs, the LEDs flicker. To reduce the flickering effects, various approaches have been utilized, trying different techniques. For example, in one approach, extra wiring on the transformer used to convert the AC voltage to the direct current (DC) voltage is used to clamp the AC voltage. In another approach, a charging circuit is used in series with the LEDs to share the output charge and to generate the clamping LED voltage. In another approach, a path parallel with the LEDs that delivers energy to the LEDs is used to generate the clamp voltage for the LEDs. The clamp voltage in those approaches, however, depends on the inductor and the capacitor value used in related circuitry. As a result, the clamp voltage changes when the inductor value and/or the capacitor value changes.

BRIEF DESCRIPTION OF THE DRAWINGS

The details of one or more embodiments of the disclosure are set forth in the accompanying drawings and the description below. Other features and advantages will be apparent from the description, drawings, and claims.

Like reference symbols in the various drawings indicate like elements.

DETAILED DESCRIPTION

Embodiments, or examples, illustrated in the drawings are disclosed below using specific language. It will nevertheless be understood that the embodiments and examples are not intended to be limiting. Any alterations and modifications in the disclosed embodiments, and any further applications of the principles disclosed in this document are contemplated as would normally occur to one of ordinary skill in the pertinent art. Reference numbers may be repeated throughout the embodiments, but they do not require that feature(s) of one embodiment apply to another embodiment, even if they share the same reference number.

Some embodiments can have one or a combination of the following features and/or advantages. In some embodiments, the anti-flickering mechanisms are used in triode for alternating current (TRIAC) dimming applications. In some embodiments, power efficiency is increased. In some embodiments, energy is saved because while power (e.g., voltage/current) is provided to light the LEDs, the same energy is used to charge a storage capacitor based on which a voltage is generated and later used to light the LEDs.

Exemplary Circuit

Figure 1:
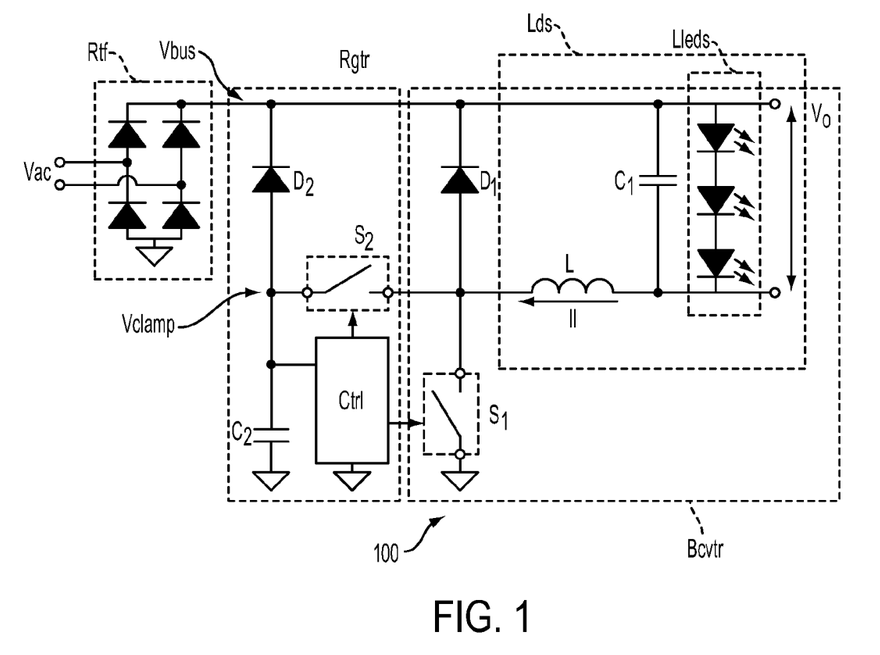
FIG. 1 is a circuit illustrating LEDs with anti-flickering mechanisms, in accordance with some embodiments.

FIG. 1 is a diagram of an LED circuit 100 with anti-flickering mechanisms, in accordance with some embodiments.

In the embodiments of FIG. 1, rectifier Rtf is known in the art and is used for illustration. Other circuits (e.g., voltage sources) providing an analog signal are within the scope of various embodiments. For simplicity, details of rectifier Rtf's elements are not described. Rectifier Rtf converts input AC voltage Vac to a voltage Vbus used to light LEDs Lleds. Voltage Vac is expressed in terms of a root means square (RMS) value and is about 85 V. Voltage Vbus is about 124-325 V and is analog (e.g., sinusoidal). When voltage Vbus drops below a predetermined value, e.g., Vo, which is about 60 V, LEDs Lleds flicker. Mechanisms are provided in various embodiments to prevent such flickering, e.g., by keeping voltage Vbus above the flickering level (i.e., above 60 V).

Buck converter Bcvtr is a DC-DC voltage step down converter, having capacitor $C_1$ and Inductor L storing the energy. Each of diode D1 and switch S1 serves as a current path for the current flowing through inductor L, e.g., current I1. For example, when switch S2 is open, if switch S1 is closed and diode D1 is reverse biased, current I1 flows through switch S1 to ground. But if switch S1 is open, current I1 flows through diode D1 providing energy to capacitor C1 and voltage Vo. The time period during which switch S1 is closed is proportionate to current I1 and thus voltage Vo. Controlling the time period during which switch S1 is closed and open provides the desired current I1 and thus voltage Vo to light LEDs Lleds.

Regulator Rgtr provides a supply voltage, e.g., voltage Vclamp, to voltage Vbus when voltage Vbus falls below a predetermined value, e.g., Vo. Capacitor C2 stores charges and charges voltage Vclamp. Switch S2 connects or disconnects voltage Vclamp to or from inductor L. Switch S2 (together with switch S1) provides different current paths for current I1. Controller Ctrl, based on voltage Vclamp and/or current I1 flowing through switch S1, controls the switching sequence for switch S1 and switch S2. Diode D2 (together with switch S2) provides the current path for current I1. For example, when switch S2 is closed and diode D2 is reverse biased, current I1 flows through switch S2 and capacitor C2 to ground. But if diode D2 is forward biased, current I1 flows through diode D2, e.g., to light LEDs Lleds. Diode D2 (and D1) is used to automatically create the current paths and voltages based on the relationship between voltage Vbus and voltage Vclamp. For example, when voltage Vclamp is higher than voltage Vbus, diode D2 is forward biased, and voltage Vclamp is automatically transferred to voltage Vbus, but when voltage Vclamp is less than voltage Vbus, diode D2 is reversed biased and the current path between the node of voltage Vclamp and the node of voltage Vbus is automatically cut off. In effect, diode D2 functions as a switch. Other switching circuitry, e.g., a switch including a metal oxide silicon field effect transistor (MOSFET), a junction field effect transistor (JFET), etc., can be used in place of diode D1 and/or D2. Further, the circuit switching circuitry is controlled to open/close and thus forms the current paths.

In some embodiments, when Vbus drops below voltage Vo, switch S2 is closed such that voltage Vclamp is used to keep voltage Vbus above the predetermined voltage Vo that keeps lighting LEDs Lleds. Because voltage Vbus remains above voltage Vo, LEDs Lleds continue to light, and therefore do not turn off or flicker. In effect, flickering is prevented. In some embodiments, switch S2 is implemented using a thyristor including, for example, a silicon-controlled rectifier (SCR), a gate-turn-off (GTO) thyristor, or a tridode for alternating current (TRIAC), which is commonly known as a bidirectional triode thyristor.

LEDs Lleds use voltage Vo, which, in some embodiments, is at about 60 V to 80V. LEDs Lleds together with capacitor C1 and/or inductor L are commonly considered a load (e.g., load Lds) of circuit 100. Various embodiments are not limited to a particular load. Exemplary loads include one or a combination of resistors, capacitors, inductors, and/or other elements, circuitry, etc.

Exemplary Waveforms

Figure 2A:
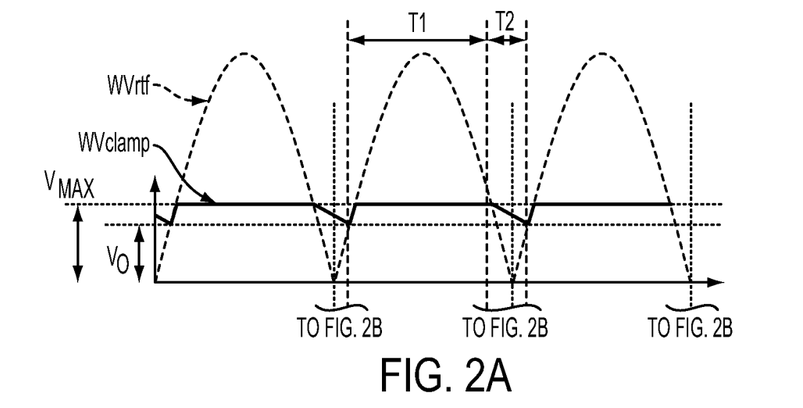
FIGS. 2A and 2B are graphs of waveforms illustrating the behavior of some voltages in the circuit of claim 1, in accordance with some embodiments.

FIG. 2A is a graph of waveforms illustrating the behavior of various voltages, in accordance with some embodiments. Waveform WVrtf represents the voltage at the output of rectifier Rtf (e.g., voltage Vrtf) without the anti-flickering mechanisms of various embodiments of the present disclosure. As illustratively shown through waveform WVrtf, voltage Vrtf is higher than voltage Vclamp during time period T1, and is lower than voltage Vclamp during time period T2. Without the anti-flickering mechanisms of various embodiments, e.g., if voltage Vrtf is used to provide the power for voltage Vbus, which in turn provides the power to voltage Vo, LEDS Lleds would flicker when voltage Vbus or voltage Vrtf falls below voltage Vo.

Waveform WVclamp represents voltage Vclamp. During time period T1, voltage Vclamp starts at voltage Vo, increases to voltage Vmax, and remains at the Vmax constant level until voltage Vclamp decreases at the beginning of time period T2. During time period T2, voltage Vclamp initially decreases because voltage Vclamp is used to light LEDs Lleds, until voltage Vclamp reaches voltage Vo. Voltage Vclamp then increases because in circuit 100, via capacitor C2, voltage Vclamp is charged until voltage Vclamp reaches voltage Vmax. Time period T1 corresponds to the operation of circuit 100 illustrated by circuits 300, 400, or 500 in the below FIG. 3, 4, or 5, respectively, while time period T2 corresponds to the operation of circuit 100 illustrated by circuits 400 and 600 in the below FIGS. 4 and 6, respectively. In some embodiments, time period T2 is about 20% of the total time period T1+T2 (e.g., T2/(T1+T2)=20%).

In some embodiments, voltage Vmax is arbitrarily chosen above voltage Vo so that voltage Vclamp has sufficient power to provide to voltage Vbus, and thus voltage Vo, to light LEDs Lleds. In other words, voltage Vclamp is maintained above voltage Vo, but below voltage Vmax. For illustration, voltage ΔVclamp represents the difference between voltage Vo and voltage Vmax or the holding voltage when voltage Vrtf is less than voltage Vclamp. Mathematically expressed:

$$Vmax = Vo + \Delta Vclamp$$

In some embodiments, voltage ΔVclamp is calculated based on the change in time period T2 (e.g., ΔT2) and capacitor C2. If ΔV1 is the change in the voltage through inductor L and ΔI1 is the change in the current through inductor L in the same time period ΔT2, then $$\Delta V1 = L * \Delta I1 / \Delta T2$$

If IC2 is the current flowing through capacitor C2

$$IC2 = C2 * \Delta Vclamp / \Delta T2$$

In some embodiments, current IC2 depends on the load current, e.g., current Iload, and capacitor C2 is selected such that current IC2 is greater than Iload. Further, Ilmin varies and is selected based on the equation $Ilmin = \Delta V1 * \Delta T2 / L$. For example, Ilmin is about 100 mA, corresponding to a ΔT2 of 2 μs having inductor L at 1 mH.

Figure 2B:
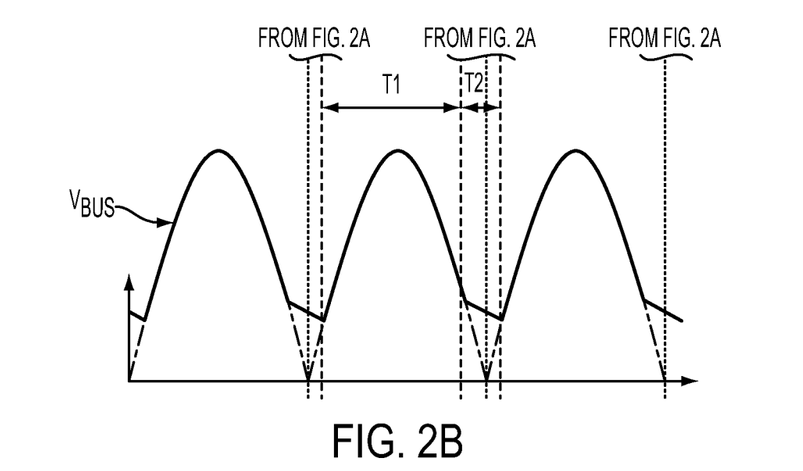

In some embodiments, voltage Vbus is a combination of voltage Vrtf and voltage Vclamp at different time periods. FIG. 2B is a graph of waveform WVbus representing voltage Vbus. During time period T1, voltage Vbus follows voltage Vrtf, and during time period T2, voltage Vbus follows voltage Vclamp.

Exemplary Circuits in Various Operations

FIGS. 3-6 are diagrams of circuits 300-600 illustrating circuit 100 operating in different conditions. In some embodiments, each of circuits 300, 400, 500, and 600 is used to drive load Lds. At the same time of driving load Lds, circuit 300 stores current I1, circuit 400 releases current I1, circuit 500 stores current I1 and charges voltage Vclamp, and circuit 600 stores current I1 and discharges voltage Vclamp (e.g., by load Lds consuming power).

In some embodiments, controller Ctrl continuously determines the relationship between voltage Vbus and voltage Vclamp, based on which, controller Ctrl controls (e.g., open/close) switch S1 and/or S2. For illustration, initially, switches S1 and switch S2 are open. In some embodiments, when circuit 100 is powered on, controller Ctrl detects current I1 at switch S1, and recognizes that current I1 is 0 A (i.e., because switch S1 is open). Thus, controller Ctrl closes switch S1. As a result, because switch S2 is open and switch S1 is closed, current I1 flows from the output of rectifier Rtf through load Lds (e.g., capacitor C1 and LEDs Lleds), inductor L, and switch S1 to ground, which is shown as path 310 in circuit 300 of FIG. 3.

Figure 3:
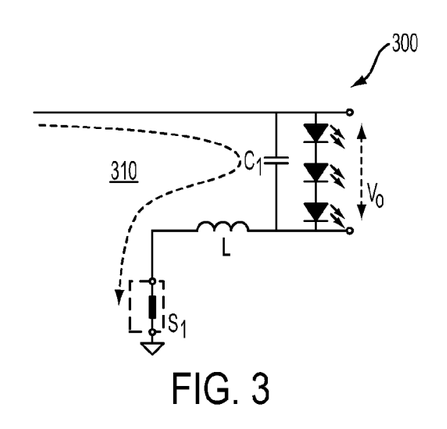
FIGS. 3-6 are diagrams illustrating the circuit in FIG. 1 having different current paths.
Figure 4:
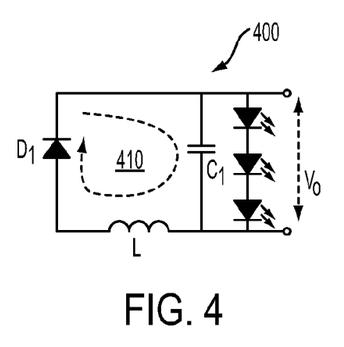
Figure 5:
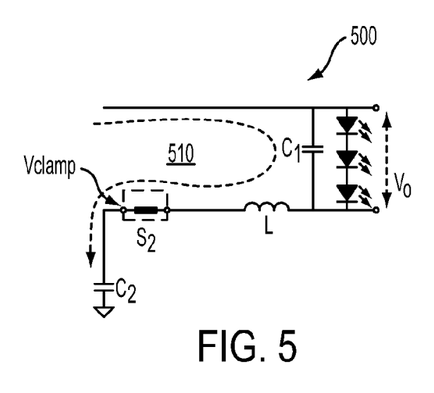
Figure 6:
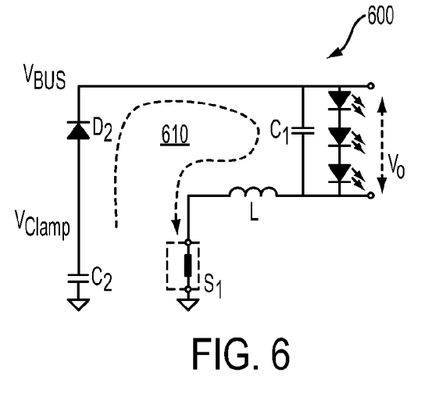

In FIG. 3, if voltage Vbus is less than voltage Vclamp, diode D2 is forward biased, and the current flows in path 610 described below in conjunction with circuit 600 of FIG. 6. If however, voltage Vbus is greater than voltage Vclamp, current I1 increases as the current I1 stars flowing through inductor L. When current I1 reaches a predetermined high limit (e.g., current I1 is about 1 to 10 μA higher than current Ilmax), controller Ctrl opens switch S1 and closes switch S2, resulting in circuit 500 in FIG. 5. Alternatively, controller Ctrl opens switch S1 without closing switch S2. As a result, current I1 is forced to seek a path to ground. Current I1 thus causes diode D1 to be forward biased, and loops through diode D1, capacitor C1 and LEDs Lleds, and inductor L, as shown as path 410 in circuit 400 of FIG. 4. In some embodiments, current Ilmax is set sufficient to light LEDs Lleds and varies depending on technologies. Some exemplary values of current Ilmax corresponding to various technologies include 200 mA, 400 mA, 1 A, etc.

In circuit, 400, if voltage Vbus is less than voltage Vclamp, controller Ctrl closes switch S1 and opens switch S2, and current I1 flows in path 610 as described in circuit 600 in FIG. 6 below. If, however, voltage Vbus is greater than voltage Vclamp, because LEDs Lleds consume energy, current I1 starts decreasing. When current I1 reaches a predetermined low limit (e.g., current I1 is about 1 to 10 μA lower than current Ilmin), controller Ctrl closes switch S2, which creates a ground path for current I1. As a result, current I1 flows through capacitor C1 and LEDs Lleds, inductor L, switch S2, and capacitor C2, shown as path 510 in circuit 500 of FIG. 5. Alternatively, controller Ctrl closes switch S1 and opens switch S2, resulting in circuit 300 in FIG. 3.

In circuit 500, if voltage Vbus is lower than voltage Vclamp, controller Ctrl closes switch S1 and opens switch S2, and current I1 flows in path 610 in circuit 600 of FIG. 6 as described below. If, however, voltage Vbus is greater than voltage Vclamp, because current I1 flows through capacitor C2, voltage Vclamp at one end of capacitor C2 is charged and thus increases. After voltage Vclamp reaches voltage Vmax, controller Ctrl closes switch S1 and opens switch S2. Current I1 flows in path 310 in FIG. 3, and continues therefrom as explained above. In effect, Vclamp is clamped at (i.e., limited to) voltage Vmax shown in FIG. 2A during time period T1. Alternatively, controller Ctrl opens switch S1 and switch S2, resulting in circuit 400.

In circuit 600, if voltage Vbus is greater than voltage Vclamp, diode D2 is reverse biased, resulting in an open circuit, and current I1 flows in path 310 in circuit 300. If, however, voltage Vbus is less than voltage Vclamp, current I1 flows through diode D2, capacitor C1 and LEDs Lleds, inductor L, and switch S1, shown as path 610. Current I1 then increases because when switch S1 is closed, inductor L is electrically connected to ground, resulting in a positive voltage (e.g., $\Delta V_L$) across inductor L. Further, because $\Delta V_L = L \ast \Delta I_L / \Delta T$, when $\Delta V_L$ is positive, $\Delta I_L$ is positive or, in other words, current I1 increases. When current I1 reaches current I1max, controller Ctrl opens switch S1 and switch S2. Because switch S1 is open, current I1 is forced to seek another ground/path, and consequently causes diode D1 to be forward biased. As a result, current I1 flows through diode D1, capacitor C1 and LEDs Lleds, and inductor L, as shown in path 410 in circuit 400 of FIG. 4. In some embodiments, current I1max is set depending on the load consumption. For example, if the load needs a max of 1 A, current I1max is set to 1 A. But if the load needs a maximum of 2 A, then current I1max is set at 2 A, etc.

In some embodiments, when circuit 100 is first powered on, switch S1 and S2 are both open and controller Ctrl determines the relationship between voltage Vclamp and voltage Vmax to control switch S1 and switch S2. For example, if voltage Vclamp is less than voltage Vmax, controller Ctrl closes switch S2 and current I1 flows in path 510 in circuit 500. But if voltage Vclamp is greater than voltage Vmax, controller Ctrl closes switch S1, and current I1 flows in path 310 in circuit 300.

Exemplary Circuits—Some Further Embodiments

Figure 7:
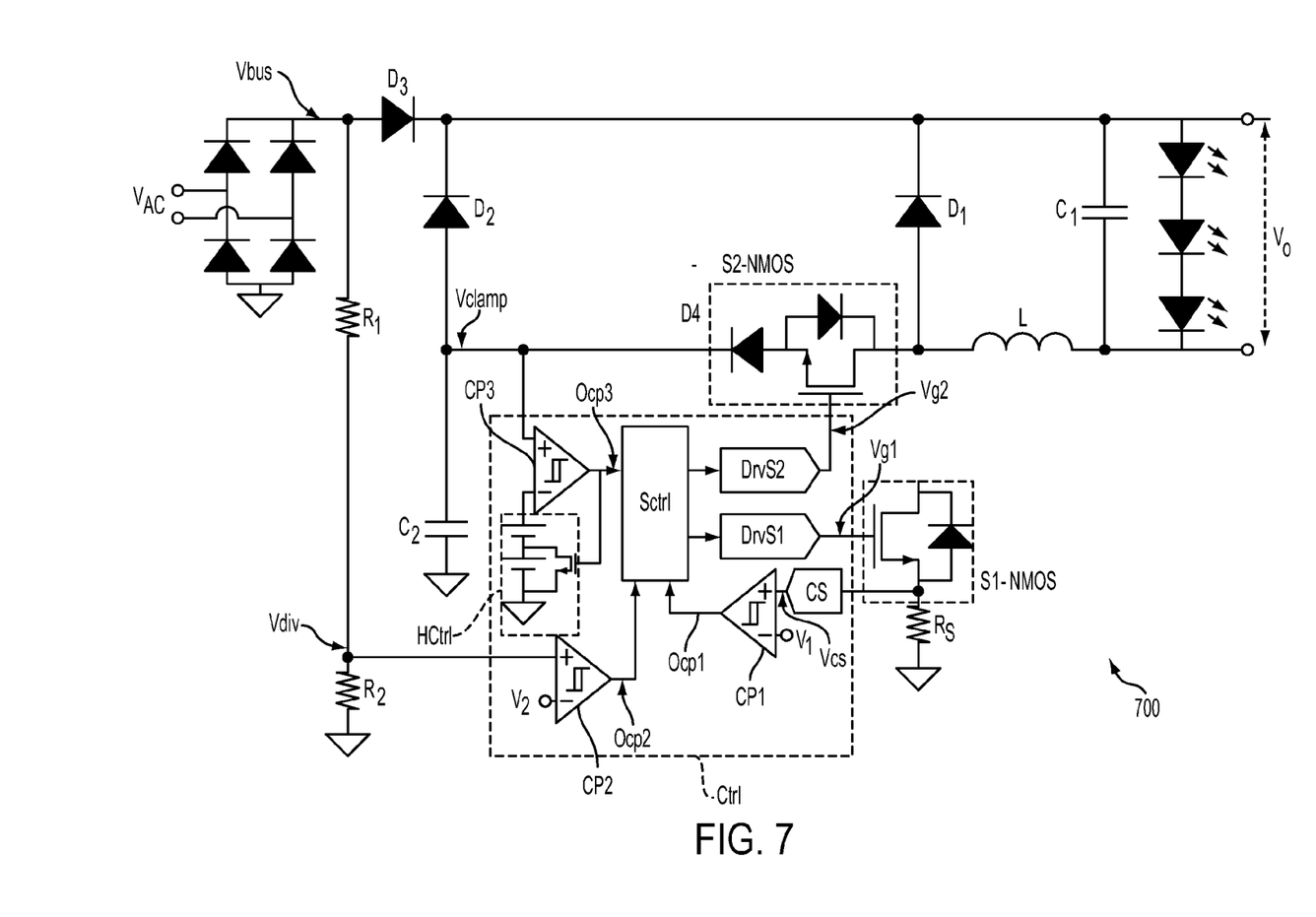
FIGS. 7 and 8 are circuits illustrating LEDs with anti-flickering mechanisms, in accordance with some further embodiments.

FIG. 7 is a diagram of a circuit 700 illustrating an LED circuit having anti-flickering mechanisms, in accordance with some further embodiments. Compared with circuit 100, circuit 700 includes exemplary implementations of switches S1 and S2. Circuit 700 also includes circuitry and signals provided to controller Ctrl for controller Ctrl to control (e.g., open and/or close) switches S1 and S2.

Switch S1 is implemented as a power NMOS transistor (e.g., transistor S1-NMOS). For example, when voltage Vg1, e.g., the voltage at the gate of transistor S1-NMOS, is at a high logic level (e.g., High), transistor S1-NMOS is on, and switch S1 is closed. But if voltage Vg1 is at a low logic level (e.g., Low), transistor S1-NMOS is off, and switch S1 is open.

Switch S2 is implemented as a power NMOS transistor (e.g., transistor S2-NMOS) coupled in series with a diode, e.g., diode D4. When the voltage level at the gate of transistor S2-NMOS, e.g., voltage Vg2, is High, switch S2 is closed. But if voltage Vg2 is Low, transistor S2-NMOS is off, and switch S2 is open. Diode D4 prevents the current at node Vclamp flowing through the source of transistor S2_NMOS.

Drivers DrvS1 and DrvS2 act as buffers buffering signals from controller Sctrl to the corresponding signals Vg1 and Vg2.

Current sensor CS detects the current at the source of transistor S1-NMOS and converts it to a voltage, e.g., voltage Vcs, at the positive input of comparator CP1. If voltage Vcs is higher than reference voltage V1, then output of comparator CP1 (e.g., output Ocp1) is High. But if voltage Vcs is lower than reference voltage V1, output Ocp1 is Low. In some embodiments, output Ocp1 is High when current I1 is greater than current I1max, and output Ocp1 is Low when current I1 is less than current I1min. Sequence controller Sctrl, based on output Ocp1 and through driver DrvS1, provides voltage Vg1. In some embodiments, if output Ocp1 is High, controller Sctrl causes voltage Vg1 to be Low, but if output Ocp1 is Low, then controller Sctrl causes voltage Vg1 to be High. Voltage Vg1 is used to close/open switch S1 as explained above. In effect, sequence controller Sctrl opens/closes switch S1 based on the amount of current flowing through switch S1 and detected at the source of transistor S1-NMOS.

Resistors R1 and R2 serve as a voltage divider such that the voltage at the positive terminal of comparator CP2, e.g., voltage Vdiv, is a reduced voltage of voltage Vbus. Comparator CP2, in conjunction with voltage Vdiv, is used to determine whether voltage Vbus is greater or less than voltage Vclamp. If voltage Vdiv is higher than reference voltage V2 (e.g., voltage Vbus is greater than voltage Vclamp), then comparator CP2 generates a High at the output of comparator CP2, e.g., out Ocp2. But if voltage Vdiv is lower than reference voltage V2 (e.g., voltage Vbus is lesser than voltage Vclamp), comparator CP2 generates a Low at output Ocp2. Sequence controller Sctrl, based on output Ocp2, opens or closes switch S2. For example, when output Ocp2 is High, controller Sctrl causes voltage Vg2 to be the result of the AND operation between output Ocp2 and output Ocp3. But when Ocp2 is Low, controller Sctrl causes voltage Vg2 to be Low. Because comparing voltage Vdiv with voltage V2 is a way of comparing voltage Vbus with voltage Vclamp, sequence controller Sctrl, in effect, opens and closes switch S2 based on voltage Vbus compared with voltage Vclamp.

Hysterisis controller Hctrl at the negative input of comparator CP3 provides a range of voltages having an upper limit (e.g., 70 V for voltage Vmax) and a lower limit (e.g., 60 V for voltage Vo) for use by comparator CP3. Comparator CP3 compares voltage Vclamp to the range of voltage provided by hysterisis controller Hctrl and provides a signal at the output of comparator CP3, e.g., output Ocp3. Driver DrvS2, based on output Ocp3, provides appropriate voltage Vg2 to control switch S2. When output Ocp3 is High, voltage Vclamp is greater than voltage Vmax, driver DrvS2 provides a Low to voltage Vg2 to open switch S2. When output Ocp3 is Low, voltage Vclamp is less than voltage Vmax, driver DrvS2 provides a High for voltage Vg2 to close switch S2.

Figure 8:
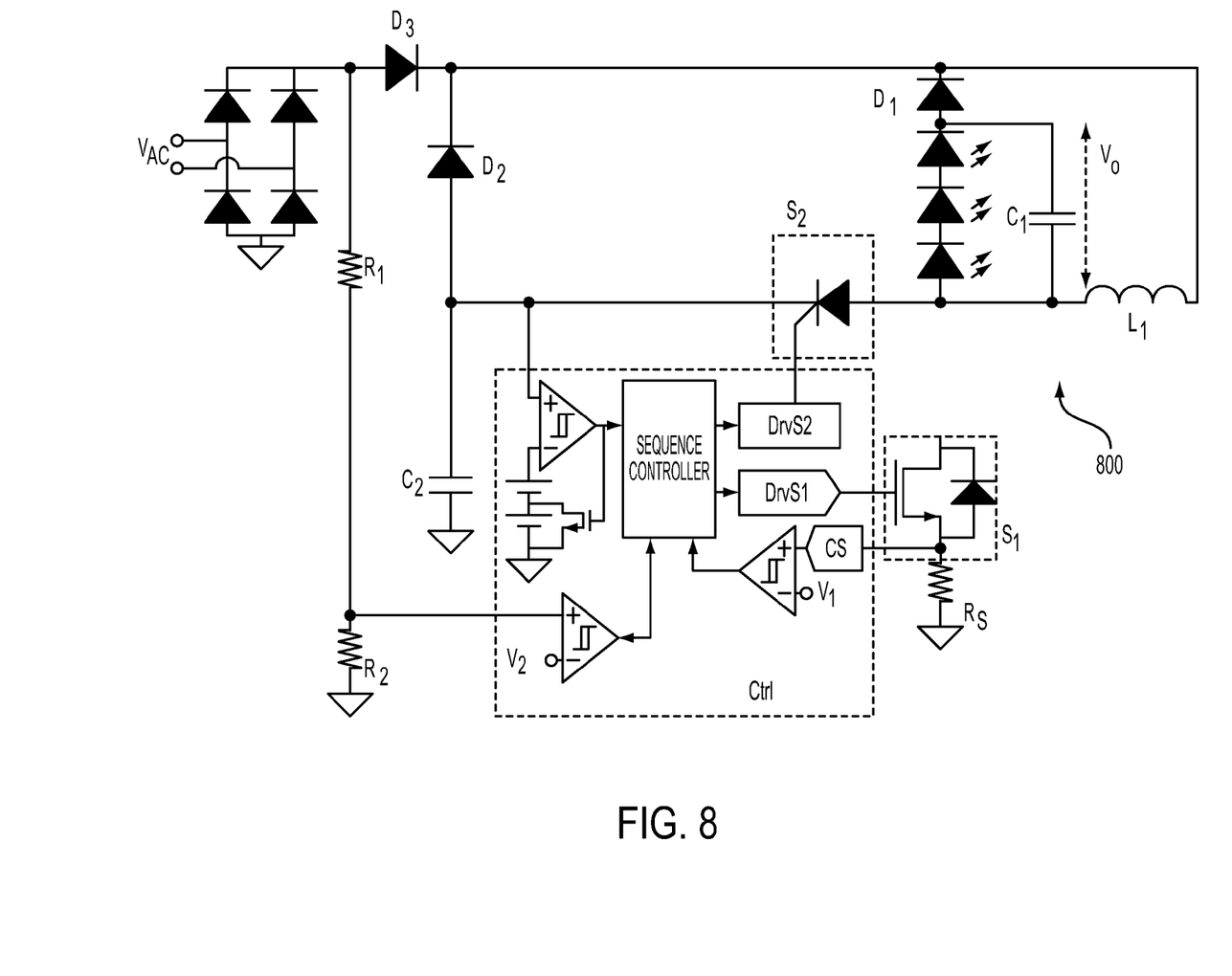

FIG. 8 is a diagram of a circuit 800 in accordance with some embodiments. For simplicity, various details of FIG. 8 are not shown. Compared with circuit 700, in circuit 800, switch S2 is implemented as a silicon control rectifier (SCR) instead of a power NMOS. In addition, the position of LEDs Lleds in FIG. 8 has been changed. For example, in FIG. 8, LEDs Lleds are in parallel with capacitor C1 and in series diode D1 then inductor L. In contrast, in FIG. 7, LEDs Lleds are in parallel with capacitor C1, then in series with inductor L, then diode D1. Various embodiments are not limited to the position of LEDs Lleds.

FIGS. 7 and 8 show two implementations for switch S2. Other implementations are within the scope of various embodiments, including for example gate-turn-off thyristors (GTO), TRIAL, etc. Various embodiments are not limited to a particular implementation. Further, in the above illustrations, controller Ctrl, instead of determining current at switch S1, compares reference voltage V1 against a voltage, e.g., voltage Vo1 (not labeled) derived from voltage Vo.

Exemplary Methods

Figure 9:
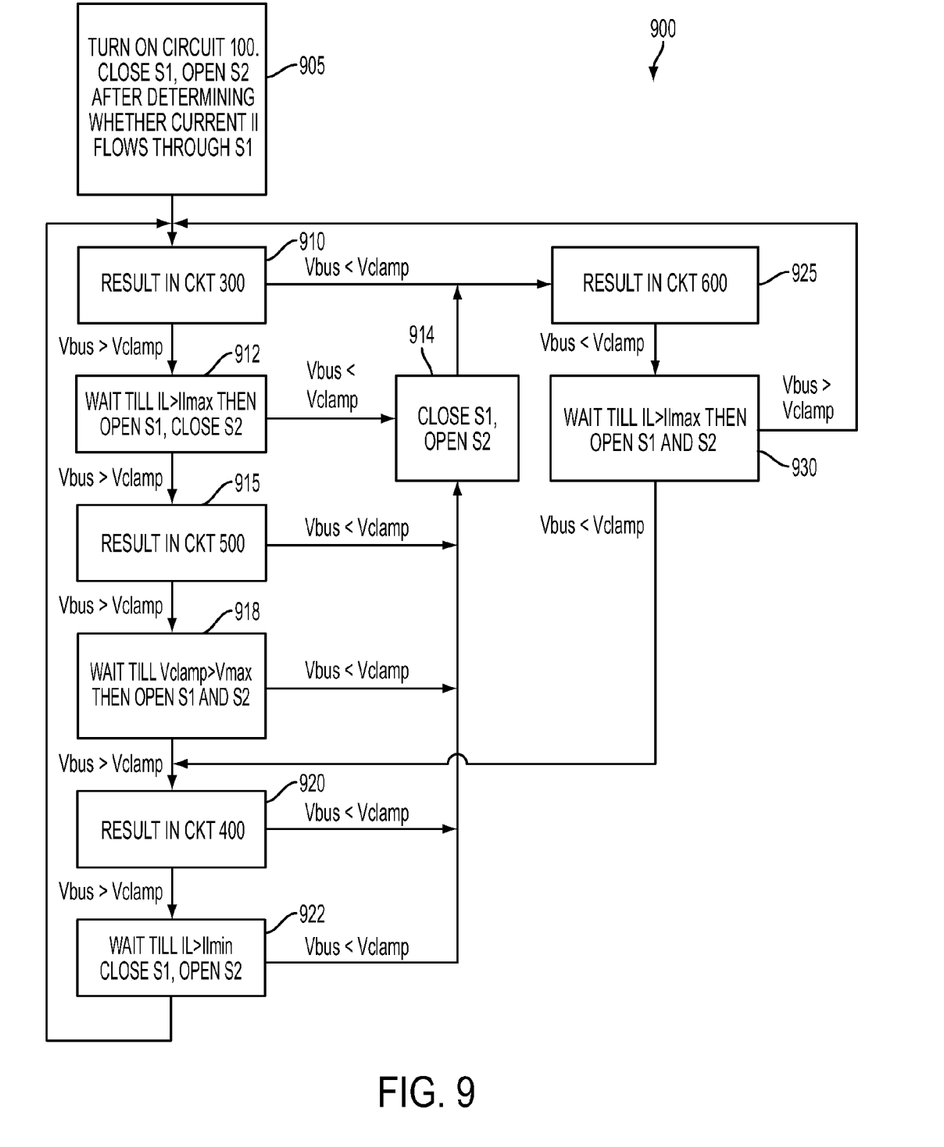
FIG. 9 is a flowchart illustrating an operation of circuit 100, in accordance with some embodiments.

FIG. 9 is a flowchart 900 of a method illustrating an operation of circuit 100, in accordance with some embodiments. In this illustration, switches S1 and S2 are initially open.

In step 905, circuit 100 is powered on. Controller Ctrl determines the current (e.g., current I1) flowing through switch S1 or one end of resistor Rs, and recognizes that because switch S1 is open, there is no current flowing through switch S1 (e.g., current I1=0 A). Controller Ctrl then closes switch S1 (while switch S2 remains open), resulting in circuit 300 in step 910.

In step 910, if voltage Vbus is less than voltage Vclamp, diode D2 is forward biased, flowchart 900 flows to step 925 in which circuit 100 operates as circuit 600. If voltage Vbus, however, is greater than voltage Vclamp, current I1, in step 912, increases. During the time current I1 increases, if voltage Vbus is less than voltage Vclamp, controller Ctrl closes switch S1 and opens switch S2 in step 914, and circuit 300 transforms into circuit 600 in step 925. In step 912, after current I1 reaches (e.g., is a little greater than) current I1max, controller Ctrl opens switch S1 and closes switch S2. As a result, circuit 100 operates as circuit 500 in step 915.

In step 915, if voltage Vbus is less than voltage Vclamp, controller Ctrl closes switch 51 and opens switch S2 in step 914. Flowchart 900 flows to step 925 in which circuit 100 operates as circuit 600. If voltage Vbus, however, is greater than voltage Vclamp, voltage Vclamp increases (e.g., is charged by capacitor C2). During the time voltage Vclamp increases, if voltage Vbus is less than voltage Vclamp, controller Ctrl closes switch S1 and open switch S2 in step 914, resulting in circuit 600 in step 925. In step 918, after voltage Vclamp reaches voltage Vmax (e.g., voltage Vclamp is about 1 to 10 mV greater than voltage Vmax), controller Ctrl opens switch S1 and switch S2, resulting in circuit 400 in step 920.

In step 920, if voltage Vbus is less than voltage Vclamp, controller Ctrl, in step 914, closes switch S1 and opens switch S2. Flowchart 900 then flows to step 925 in which circuit 100 operates as circuit 600. If, however, voltage Vbus is greater than voltage Vclamp, current I1 starts decreasing. In step 922, while current I1 continues to decrease, if voltage Vbus is less than voltage Vclamp, controller Ctrl, in step 914, closes switch S1 and opens switches S2, resulting in circuit 600 in step 925. In step 922, after current I1 reaches current I1min (e.g., current I1 is lower than current I1min), controller Ctrl closes switch S1 and opens switch S2, resulting in circuit 300 in step 910.

In step 925, while circuit 600 is active, voltage Vbus is lesser than voltage Vclamp, and current I1 increases. In step 930, while current I1 continues to increase, if voltage Vbus is greater than voltage Vclamp diode D2 is reverse biased, resulting in an open circuit. Flowchart 900 flows to step 910 in which circuit 100 operates as circuit 300. In step 930, however, after current I1 reaches current I1max, controller Ctrl opens switch S1 and switch S2. Flowchart 900 flows to step 920 in which circuit 100 operates as circuit 400.

Figure 10:
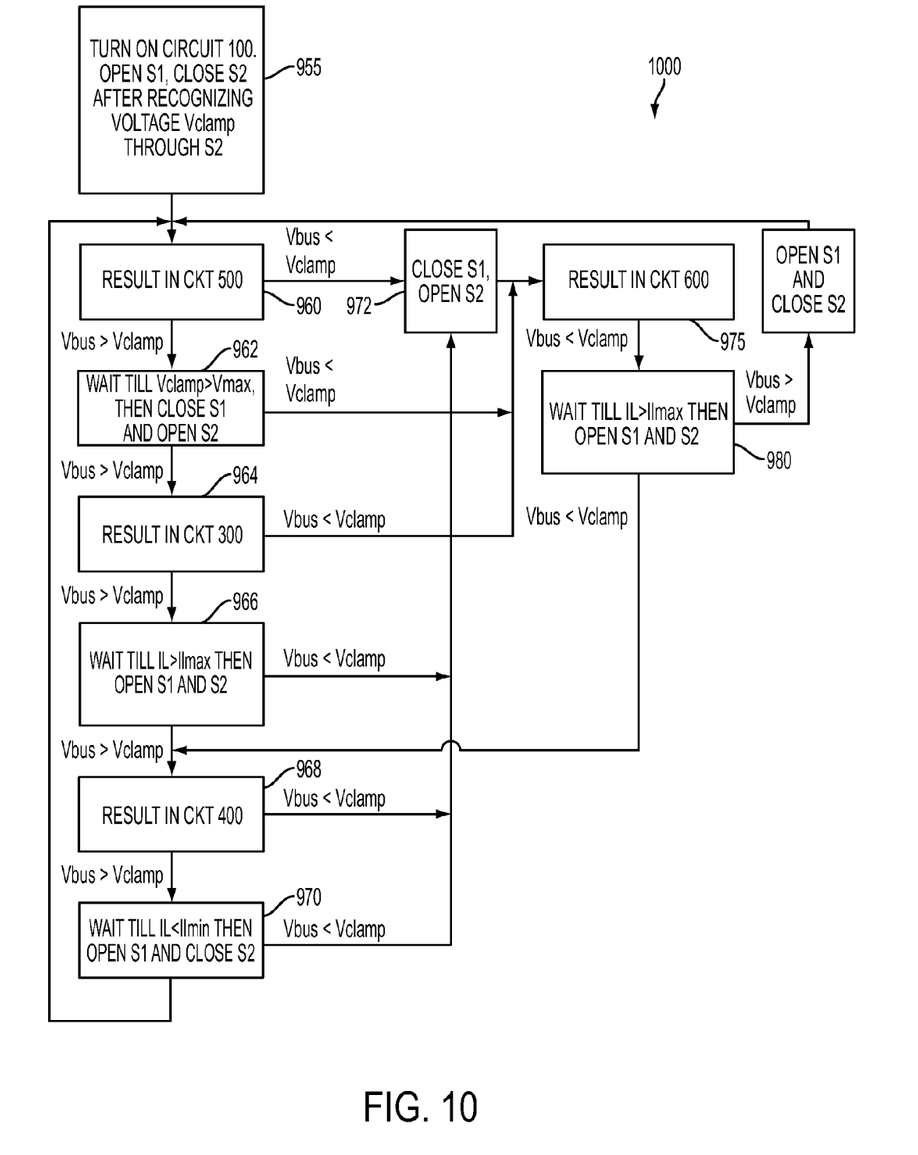
FIG. 10 is a flowchart illustrating an operation of circuit 100, in accordance with some further embodiments.

FIG. 10 is a flowchart 1000 of a method illustrating an operation of circuit 100, in accordance with some embodiments. In this illustration, switches S1 and S2 are initially open.

In step 955, circuit 100 is powered on. Controller Ctrl determines the value of voltage Vclamp at switch S2 and recognizes that voltage Vclamp is 0 V as circuit 100 has just been powered on. Controller Ctrl closes switch S2 (switch S1 remains open), resulting in circuit 500 in step 960 in which voltage Vclamp is charged by capacitor C2. In step 960, if voltage Vbus is less than voltage Vclamp, controller Ctrl closes switch S1 and opens switch S2 in step 972, resulting in circuit 600 in step 975. If, however, voltage Vbus is greater than voltage Vclamp, capacitor C2 continues to charge voltage Vclamp until voltage Vclamp reaches voltage Vmax (e.g., voltage Vclamp is a little higher than voltage Vmax) in step 962, controller Ctrl then closes switch S1 and opens switch S2. At that time, if voltage Vbus is less than voltage Vclamp, circuit 500 operates as circuit 600 in step 975 because diode D2 is forward biased. If, however, voltage Vbus is greater than voltage Vclamp, circuit 500 operates as circuit 300 in step 964 because diode D2 is reverse biased.

In step 964, if voltage Vbus is lesser than voltage Vclamp, diode D2 is forward biased, flowchart 900 flows to step 925 in which circuit 100 operates as circuit 600. If voltage Vbus, however, is greater than voltage Vclamp, current I1, in step 964, increases. When current I1 reaches (e.g., is a little greater than) current I1max, controller Ctrl opens switch S1 and switch S2 in step 966. If voltage Vbus is less than voltage Vclamp, controller Ctrl in step 972 opens switch S1 and closes switches S2, resulting in circuit 600 in step 975. If, however, voltage Vbus is greater than voltage Vclamp, controller Ctrl opens switches S1 and S2, which results in circuit 400 in step 968.

In step 968, if voltage Vbus is less than voltage Vclamp, controller Ctrl, in step 972, closes switch S1 and opens switch S2, resulting in circuit 600 in step 975. If, however, voltage Vbus is greater than voltage Vclamp, current I1 starts decreasing. In step 970, while current I1 continues to decrease, if voltage Vbus is less than voltage Vclamp, controller Ctrl, in step 972, closes switch S1 and opens switches S2, resulting in circuit 600 in step 975. In step 970, after current I1 reaches current I1min (e.g., current I1 is a little lower than current I1min), controller Ctrl opens switch S1 and closes switch S2, resulting in circuit 500 in step 960.

In step 975, while circuit 600 is active, voltage Vbus is lesser than voltage Vclamp, and current I1 increases. In step 980, while current I1 continues to increase, if voltage Vbus is greater than voltage Vclamp, controller Ctrl open switch S1 and closes switch S1, resulting in circuit 500 in step 960. In step 980, after current I1 reaches current I1max, controller Ctrl opens switch S1 and switch S2. Flowchart 900 flows to step 968 in which circuit 100 operates as circuit 400.

In the above illustration, flow charts 900 and 1000 flow in a way that circuit 100 operates in different conditions, but voltage Vbus is maintained higher than voltage Vo sufficient for LEDs Lleds to remain lit and not to flicker. Flow charts 900 and 1000 show some illustrations wherein circuit 100 operates as a first particular circuit (e.g., circuit 300 in step 910) then as a second particular circuit (e.g., circuit 500 in step 915), but the circuit operational changes can be different, e.g., from circuit 300 to circuit 400 or circuit 600, etc., and the different operational changes are within the scope of the various embodiments.

A number of embodiments have been described. It will nevertheless be understood that various modifications may be made without departing from the spirit and scope of the disclosure. For example, the various transistors being shown as a particular dopant type (e.g., NMOS and PMOS) are for illustration purposes, embodiments of the disclosure are not limited to a particular type, but the dopant type selected for a particular transistor is a design choice and is within the scope of embodiments. The logic level (e.g., low or high) of the various signals used in the above description is also for illustration purposes, embodiments are not limited to a particular level when a signal is activated and/or deactivated, but, rather, selecting such a level is a matter of design choice.

The various figures showing the resistor, capacitor, and inductor circuits using discrete resistors, capacitors, and inductors are for illustration; equivalent circuitry may be used. For example, a resistive device, circuitry, or network (e.g., a combination of resistors, resistive devices, circuitry, etc.) can be used in place of a resistor. A capacitive device, circuitry, or network (e.g., a combination of capacitors, capacitive devices, circuitry, etc.) can be used in place of a capacitor, and an inductive device, circuitry or network (e.g., a combination of inductors, inductive devices, circuitry, etc.) can be used in place of an inductor.

Some embodiments regard a circuit that comprises a first switch having a first first-switch end and a second first-switch end; a second switch having a first second-switch end and a second second-switch end; a capacitive device having a first capacitive end and a second capacitive end; a third switch having a first third-switch end and a second third-switch end; a fourth switch having a first fourth-switch end and second fourth-switch end; and a voltage source. A first node having a first voltage is coupled to the first fourth-switch end, to the first second-switch end, and to the first capacitive end. A second node having a second voltage is coupled to the voltage source, to the second fourth-switch end, and to the second third-switch end. A third node is coupled to the second second-switch end, and to the first first-switch end. The first switch and the second switch are configured such that the first node and the voltage source selectively provide the second voltage.

Some embodiments regard a method that includes: generating a first voltage at a first node by controlling a first switch and a second switch; generating a second voltage at a second node by a first voltage source; and combining the first voltage and the second voltage to form a third voltage for use by an electrical load, based on a relationship between the first voltage and the third voltage; the relationship used to control a third switch. The first node is coupled to a first end of the third switch, a first end of the second switch, and a first end of a capacitor. The second node is coupled to a second end of the third switch and to a first end of the electrical load. A second end of the second switch is coupled to a first end of the first switch and to a second end of the electrical load.

Some embodiments regard method that has the following steps: transforming a base circuit having a first node coupled to a voltage source into a first circuit, a second circuit, a third circuit, or a fourth circuit based on a first switch, a second switch, a third switch, and a fourth switch, and selectively providing a voltage to the first node by the first voltage source or by a second node through the third switch, for use by the load. Each of the first circuit, the second circuit and the third circuit is configured to drive a load. While driving the load, the first circuit is configured to provide a first current path for a current through the first switch, the second circuit is configured to provide a second current path for the current through the fourth switch, the third circuit is configured to provide a third current path for the current through the second switch and to charge the second node coupled to the second switch, and the fourth circuit is configured to provide a fourth current path for the current through the third switch and the first switch, and to discharge the second node.

The above methods show exemplary steps, but they are not necessarily performed in the order shown. Steps may be added, replaced, changed order, and/or eliminated as appropriate, in accordance with the spirit and scope of disclosed embodiments.

What is claimed is:

1. A circuit comprising:
    a first switch having a first first-switch end and a second first-switch end;
    a second switch having a first second-switch end and a second second-switch end;
    a capacitive device having a first capacitive end and a second capacitive end;
    a third switch having a first third-switch end and a second third-switch end;
    a fourth switch having a first fourth-switch end and second fourth-switch end;
    a switching controller; and
    a voltage source,
    wherein
    the first, second, third, and fourth switches are different from one another;
    a first node has a first voltage and is coupled to the first fourth-switch end, to the first second-switch end, and to the first capacitive end;
    a second node has a second voltage and is coupled to the voltage source, to the second fourth-switch end, and to the second third-switch end;
    a third node is coupled to the second second-switch end, and to the first first-switch end; and
    the switching controller is configured to selectively open and close the first switch and the second switch such that the first node and the voltage source selectively provide the second voltage.

2. The circuit of claim 1, wherein the voltage source is configured to provide an analog voltage as a part of the second voltage.

3. The circuit of claim 1, further comprising a load, wherein the load includes:
    a second capacitive device having a first second-capacitive end and a second second-capacitive end;
    an inductive device having a first inductive end and a second inductive end; and at least one light emitting diode having a first light end and a second light end, wherein
    the second node is coupled to the first second-capacitive end, and to the first light end;
    the third node is coupled to the first inductive end and to the first third-switch end; and
    the second inductive end is coupled to the second second-capacitive end and to the second light end;
    or wherein
    the second node is coupled to the first inductive end;
    the second third-switch end is coupled to the first light end and to the first second-capacitive end; and
    the third node is coupled to the second light end, to the second second-capacitive end, and to the first second inductive end.

4. The circuit of claim 1, wherein the first switch is configured to close based on a detection of a current flowing through the second first-switch end, when the first switch and the second switch are open.

5. The circuit of claim 3, wherein after the first switch is closed, the second switch is open, and a current flows through the inductive device through the first switch:

the first switch is configured to open based on the current and a first predetermined current value; or the first switch is configured to open and the second switch is configured to close based on the current and the first predetermined value; or the fourth switch is configured to close based on the first voltage and the second voltage.

6. The circuit of claim 3, wherein after the first switch and the second switch are open and a current flows through the third switch and the inductive device:

the first switch is configured to close based on the current and a first predetermined current value; or the second switch is configured to close based on the current and the first predetermined current value; or the first switch is configured to close based on the first voltage and the second voltage.

7. The circuit of claim 3, wherein after the first switch is open, the second switch is closed, and a current flows through the inductive device through the second switch:

the first switch is configured to close and the second switch is configured to open based on the first voltage and a predetermined voltage value; or the second switch is configured to open based on the first voltage and the predetermined voltage value; or the first switch is configured to close and the second switch is configured to open based on the first voltage and the second voltage.

8. The circuit of claim 1, wherein after the first switch is closed, the second switch is open, and the fourth switch is closed:

the first switch and the fourth switch are configured to open; or the first switch is configured to open based on a current and a predetermined current value or the first switch is configured to open and the second switch is configured to close.

9. The circuit of claim 1, wherein when the first switch and the second switch are open, the first switch or the second switch is configured to close based on a value of the first voltage.

10. The circuit of claim 1, wherein the second switch is selected from a group consisting of a power NMOS coupled in series with a third diode, a thyristor, a silicon-controlled rectifier, a gate-turn-off thyristor, and a triode for alternating current.

11. The circuit of claim 1, wherein the third switch, the fourth switch, or both thereof are diodes.

12. The circuit of claim 1, wherein the fourth switch is configured to be automatically closed or opened based on a relationship between the first voltage and the second voltage.

13. The circuit of claim 1, wherein the third switch is configured to be automatically closed or opened based on a voltage drop across the third switch.

14. A method comprising:

generating a first voltage at a first node by controlling a first switch and a second switch;

generating a second voltage at a second node by a first voltage source; and combining the first voltage and the second voltage to form a third voltage for use by an electrical load, based on a relationship between the first voltage and the third voltage to control a third switch;

wherein the first switch, the second switch, and the third switch are separate electronic components;

at least one of the first switch, the second switch, and the third switch contains a diode component;

the first node is coupled to a first end of the third switch, to a first end of the second switch, and to a first end of a capacitor;

the second node is coupled to a second end of the third switch and to a first end of the electrical load; and a second end of the second switch is coupled to a first end of the first switch and to a second end of the electrical load.

15. The method of claim 14, wherein the third switch is selected from a group consisting of a diode, a transistor forming the diode, a MOSFET, and a JFET.

16. A method comprising:

operationally changing a base circuit having a first node coupled to a voltage source, to a first circuit, to a second circuit, to a third circuit, or to a fourth circuit based on a first switch, a second switch, a third switch, and a fourth switch, the first, second, third and fourth switches being different and separate from one another, wherein the first, second, third, and fourth switches are configured to be selectively opened and closed, and wherein each of the first circuit, the second circuit and the third circuit are configured to drive a load; and selectively providing a voltage to the first node by the first voltage source or by a second node coupled to the second switch, through the third switch, for use by the load;

wherein while driving the load the first circuit is configured to provide a first current path for a current through the first switch;

the second circuit is configured to provide a second current path for the current through the fourth switch;

the third circuit is configured to provide a third current path for the current through the second switch and to charge the second node; and the fourth circuit is configured to provide a fourth current path for the current through the third switch and the first switch and to discharge the second node.

17. The method of claim 16 further comprising at least one of the following steps:

transforming the base circuit to the first circuit by closing the first switch and opening the second switch based on a current of the load; and transforming the base circuit to the third circuit by opening the first switch and closing the second switch based on a voltage on the second node.

18. The method of claim 16 further comprising:

in the first circuit, opening the first switch and closing the second switch based on the current and a first predetermined current value;

in the third circuit, opening the first switch and the second switch based on a second voltage on the second node and a first predetermined voltage value;

in the second circuit, closing the first switch and opening the second switch; and in the fourth circuit, opening the first switch and the second switch based on a first voltage on the first node and the second voltage on the second node.

19. The method of claim 16 further comprising:

in the third circuit, closing the first switch and opening the second switch based on a second voltage on the second node and a predetermined voltage value;

in the first circuit, opening the first switch and the second switch based on the current and a predetermined current value;

in the second circuit, closing the first switch and opening the second switch or opening the first switch and closing the second switch; and in the fourth circuit, opening the first switch and the second switch based on a first voltage on the first node and the second voltage on the second node.

20. The method of claim 16, wherein the third switch is selected from a group consisting of a diode, a transistor forming the diode, a MOSFET, and a JFET.

* * * * *